United States Patent Office 3,449,074
Patented June 10, 1969

3,449,074
PROCESS FOR REMOVING TITANIUM AND VANADIUM FROM PHOSPHORIC ACID
John Schertzer, Sarnia, Ontario, Canada, assignor to The Dow Chemical Company, Midland, Mich., a corporation of Delaware
No Drawing. Continuation of application Ser. No. 457,823, May 21, 1965. This application Jan. 29, 1968, Ser. No. 701,480
Int. Cl. C01b 25/22
U.S. Cl. 23—165                    4 Claims

ABSTRACT OF THE DISCLOSURE

This invention relates to a process for recovering a purified phosphoric acid from phosphate rock by the removal of titanium and vanadium values from the phosphoric acid during the extraction step. The removal of vanadium and titanium is accomplished by forming a solution of the vanadium and titanium-containing phosphoric acid in a water-immiscible extraction agent, contacting the phosphoric acid-extraction agent solution with an aqueous solution of hydrogen peroxide and allowing the aqueous and organic phases to separate. The phosphoric acid remains in the organic phase and the titanium and vanadium are removed in the aqueous phase.

---

This is a continuation of application Ser. No. 457,823, filed May 21, 1965.

This invention relates to a process for removing titanium and vanadium from phosphoric acid. It more particularly relates to the removal of titanium and vanadium from phosphoric acid obtained by the treatment of phosphate rock with an aqueous acid to release phosphoric acid.

Phosphoric acid is a large scale commercial chemical which has significant utility either directly or in the form of a salt or derivative, in the preparation of foods, medicines, soft drinks and other areas where purity of the acid is essential to its commercial acceptability. Natural phosphate ores generally contain appreciable quantities of impurities as calcium, fluorine, iron, aluminum, silica, arsenic, titanium, vanadium and others. Purification of the phosphoric acid obtained from such ores by treatment with aqueous acids therefore entails a great deal of time and expense, yet, unless the impurities are removed, the phosphoric acid is of an inferior quality and unacceptable for many uses. Due to the difficulty and expense of metal removal from such acid, it has generally been used in its impure form to prepare fertilizers rather than purified for use in foods, soft drinks or medicines.

Processes are known whereby phosphoric acid may be economically recovered from phosphate rock by first decomposing phosphate-bearing ore with aqueous hydrochloric, sulfuric acid or nitric acid. The released phosphoric acid is then extracted from the aqueous liquor thus produced with a substantially water-insoluble organic extractant. Finally, the phosphoric acid is stripped from the water-insoluble organic extractant by liquid-liquid extraction with water to produce aqueous phosphoric acid.

This process for the recovery of phosphoric acid can be used on any calcium phosphate-containing material. Of particular utility are the naturally occurring phosphate ores, e.g., fluorapatite, chlorapatite, hydroxyapatite, carbapatite, land pebble, brown rock, and amblygonite, monazite, variscite, and fairfieldite. This process is also applicable to leached zone ore and phosphate-containing iron ores such as the $Fe_2O_3$-apatite mixed ore common to the Rocky Mountain states. The digestion and organic extraction process generally produces a relatively pure phosphoric acid compared to the wet process phosphoric acid recovered by methods other than organic extraction. However, even this relatively pure acid contains titanium and vanadium in sufficient quantity to render it undesirable or unacceptable for many purposes.

It is therefore an object of the present invention to provide a process for the removal of titanium and vanadium from phosphoric acid. It is an additional object to provide an improved process for the production of phosphoric acid from phosphate rock by the organic extraction method. It is still a further object of the present invention to provide an improved process for economically producing phosphoric acid substantially free from titanium and vanadium from a calcium phosphate-containing material.

These and other objects are attained by treating the phosphate rock or ore with hydrochloric sulfuric acid or nitric acid to release the phosphoric acid therefrom, extracting the phosphoric acid in a substantially water-insoluble organic extractant, treating the thus-produced solution of phosphoric acid and organic extractant with an aqueous solution of hydrogen peroxide to remove the titanium and vanadium therefrom and subsequently recovering the purified phosphoric acid from the organic extractant as phosphoric acid or recovering the phosphoric acid value therefrom as a derivative of phosphoric acid.

Attempts have previously been made to remove titanium and vanadium from acid-leach solutions of phosphate rock. In general, these attempts involved either extraction or precipitation of these metals. Such attempts have been generally unsuccessful, however. It has now been discovered that when the acid leach solution from phosphate rock is contained in a substantially water-insoluble organic extractant it may be treated with an aqueous solution of hydrogen peroxide and subsequently allowed to form an organic phase and an aqueous phase. The aqueous phase thus produced contains substantially all of the titanium and vanadium originally present in the phosphoric acid.

The phosphoric acid referred to herein is phosphoric acid produced by the action of an aqueous solution of an acid such as $HCl$, $H_2SO_4$ or $HNO_3$ on phosphate rock or other calcium phosphate-containing material. Such acid treatment of the rock or ore produces $CaCl_2$, $CaSO_4$ or $Ca(NO_3)_2$ and an aqueous solution of 10–50% $H_3PO_4$.

Substantially any of the known water-insoluble organic extraction agents used for the extraction of phosphoric acid may be used in this invention. These include trialkyl phosphates such as tributyl phosphate, aliphatic alcohols such as amyl alcohol, butyl alcohol, hexyl alcohol or heptyl alcohol, cyclohexanol, cyclohexanone, methylcyclohexanol and methylcyclohexanone, methyl ethyl ketone, ethyl acetate, methyl acetate, ethyl ether, propyl ether, isopropyl ether, amides such as N,N-di-n-butyloctanamide, and the like. Such extraction agents, in order to be effective and prevent undue solvent loss, should be substantially water insoluble. By this is meant that they should not be soluble in water to more than about 10% by weight. These solvents may be used alone or in combination with a diluent such as toluene, Varsol (a petroleum hydrocarbon mixture) benzene, decane, mineral spirits, xylene, kerosene, mesitylene or other diluent which is otherwise inert to the system.

Aqueous solutions of hydrogen peroxide in a concentration range of from about 0.2 to about 30% by weight $H_2O_2$ may be used to remove the titanium and vanadium, however, concentrations of from 0.25 to 3.0% by weight $H_2O_2$ are generally preferred. Below 0.2% the extraction is inefficient and the titanium and vanadium are incompletely removed. With aqueous solutions containing greater than 3% by weight $H_2O_2$, the hydrogen peroxide is extracted into the organic layer, thus reducing the efficiency of the metal removal.

Contact between the aqueous $H_2O_2$ solution and the phosphoric acid-containing organic extractant solution may be achieved by any suitable means such as stirring, agitating, liquid-liquid extraction, and the like. The volume ratio of aqueous hydrogen peroxide necessary to substantially remove titanium and vanadium from a given volume of a solution of wet process phosphoric acid in a substantially water-insoluble organic extractant is from about 1:10 to about 1:50 with a ratio of from 1:20 to 1:30 being generally preferred. The necessary time of contact between these solutions varies with the degree and efficiency of mixing but a constant time of from 5 to 30 minutes is generally suitable in a countercurrent extraction system equivalent to from 1 to 6 theoretical stages.

Once adequate contact between the two solutions is achieved, cessation of agitation or passing the mixed solutions to a quiescent zone will permit phase separation to take place. At this point, the purified phosphoric acid is contained in the organic phase and substantially all of the titanium and vanadium is contained in the aqueous phase. These phases or layers may be easily separated by known methods such as conventional decantation or by draining off one or both layers from a continuous separator.

The water layer thus separated contains some residual $H_2O_2$ in addition to the titanium and vanadium separated from the phosphoric acid.

The organic layer, after treatment with aqueous hydrogen peroxide and separation therefrom contains the purified phosphoric acid in a solution of the organic extraction agent. Recovery of the acid is generally achieved by extracting or washing the organic layer with water. The phosphoric acid is removed int othe water layer. Other methods of recovering the purified phosphoric acid values will be obvious to those skilled in the art. For example the use of sodium hydroxide solution as an extractant might advantageously be practiced if sodium phosphate was the desired end product. The solution of phosphoric acid in the organic extractant can be used directly as the source of purified phosphoric acid particularly if this acid is to be further reacted to produce as an end product a derivative of phosphoric acid.

While this process is preferably operated at ambient temperature and atmospheric pressure, such conditions are not critical to the operation of the process and moderate variation will not adversely affect results provided, of course, that the temperature is not sufficiently high that the $H_2O_2$ is unstable or reacts with the organic extractant.

The following examples are provided as a more detailed description of the invention but the invention is not to be construed as limited thereto.

EXAMPLE 1

Phosphoric acid was prepared by dissolving 2000 gm. of phosphate rock ore in a mixture of about 3 liters of 12 molar hydrochloric acid and about 1.8 liters of water. After dissolution of the ore in the acid, the material was filtered to remove a small amount of insoluble residue. The filtrate had an analysis of 16.8 weight percent phosphate, 24.7 weight percent chloride and 12.6% calcium. A portion of this material was then extracted with 3 volumes of a 50/50 mixture (by volume) of tri-n-butyl phosphate and Varsol (a petroleum aliphatic hydrocarbon mixture). One portion of the phosphoric acid-organic extractant mixture (25 parts) thus obtained was contacted with 1 part by volume of a 1% aqueous solution of hydrogen peroxide. Mixing of the two solutions was accomplished by passing them countercurrently through a series of 6 mixer-settlers. The phases were then allowed to separate and the water phase was removed from the organic phase. The water phase was straw yellow in color due to the presence of titanium and vanadium complexed with the hydrogen peroxide. The above treated solvent-phosphoric acid mixture was then washed with 3 parts of water to produce a layer of 25% by weight phosphoric acid. The acid layer was separated and found to contain 8 p.p.m. titanium and less than 1 p.p.m. vanadium.

A second portion of the organic extractant-phosphoric acid solution was not treated with hydrogen peroxide. To 25 parts of this material was added 3 parts of water to form a phosphoric acid layer containing 25 weight percent phosphoric acid. After separation and analysis, the untreated phosphoric acid was shown to contain 50 p.p.m. of titanium and 5 p.p.m. of vanadium.

Additional portions of the organic extractant-phosphoric solution were treated in the same manner with various concentrations of hydrogen peroxide in water to determine the effect thereof. The following results were obtained.

| Wt. percent $H_2O_2$ in water: | Ti+V in treated solvent-acid solution (p.p.m.) |
|---|---|
| 0 | 7.1 |
| 0.1 | 4.0 |
| 0.25 | 1.2 |
| 0.50 | 1.1 |
| 1.0 | 1.0 |
| 2.0 | 1.9 |

I claim:
1. A process for the removal of titanium and vanadium from phosphoric acid which comprises
   (1) forming a solution of phosphoric acid in a substantially water-insoluble trialkyl phosphate extraction agent,
   (2) contacting said solution of phosphoric acid and extraction agent with an aqueous solution of 0.25 to 3.0% by weight hydrogen peroxide,
   (3) allowing the organic phase containing the phosphoric acid to separate from the aqueous phase containing the titanium and vanadium thereby forming distinct layers, and
   (4) separating the organic layer from the aqueous layer.
2. A process for the removal of titanium and vanadium from phosphoric acid which comprises
   (1) forming a solution of phosphoric acid in a substantially water-insoluble trialkyl phosphate extraction agent,
   (2) contacting said solution of phosphoric acid and extraction agent with an aqueous solution of 0.25 to 3.0% by weight hydrogen peroxide wherein the ratio of hydrogen peroxide solution to organic extractant solution is from about 1:10 to 1:50,
   (3) allowing the organic phase containing the phosphoric acid to separate from the aqueous phase containing the titanium and vanadium thereby forming distinct layers, and
   (4) separating the organic layer from the aqueous layer.
3. A process for the removal of titanium and vanadium from phosphoric acid which comprises
   (1) forming a solution of phosphoric acid in tri-n-butyl phosphate,
   (2) contacting said phosphoric acid-tri-n-butyl phosphate solution with an aqueous solution of hydrogen peroxide containing 0.25 to 3.0% by weight $H_2O_2$,

(3) allowing the organic phase nad the aqueous phase to separate, and
(4) separating the organic phase from the aqueous phase.

4. In a process for the recovery of purified phosphoric acid from phosphoric acid by extracting said phosphoric acid with a substantially water-insoluble trialkyl phosphate extractant and washing said phosphoric acid-containing extractant with water to recover the phosphoric acid therefrom, the improvement which comprises contacting said phosphoric acid-containing extractant with from 2% to 10% by volume of an aqueous solution containing from about 0.25 to 3.0% $H_2O_2$, allowing the organic and aqueous phases to separate and removing the aqueous layer prior to recovery of phosphoric acid from said organic layer by washing with water.

References Cited
UNITED STATES PATENTS

| | | | |
|---|---|---|---|
| 3,072,461 | 1/1963 | Long et al. | 23—165 |
| 3,131,993 | 5/1964 | Gustison et al. | 23—18 |

OSCAR R. VERTIZ, *Primary Examiner.*

A. GREIF, *Assistant Examiner.*

U.S. Cl. X.R.

23—312